United States Patent [19]

Wolfe et al.

[11] 3,908,378

[45] Sept. 30, 1975

[54] FLUID PRESSURE RESPONSIVE DEVICE

[75] Inventors: Denis G. Wolfe; Hugh J. Tyler, both of Santa Ana, Calif.

[73] Assignee: Robertshaw Controls Company, Richmond, Va.

[22] Filed: Nov. 14, 1973

[21] Appl. No.: 415,881

[52] U.S. Cl. ............... 60/527; 73/368.3; 73/378.3; 267/161
[51] Int. Cl.². F01B 19/02; F15B 15/02; F16F 1/34; G01K 5/32
[58] Field of Search ............................. 60/527–529, 60/530–531; 73/378.3, 368.2, 368.3; 267/159, 161 X

[56] References Cited
UNITED STATES PATENTS

| | | | |
|---|---|---|---|
| 2,102,656 | 12/1937 | Vaughn | 73/378.3 X |
| 2,920,486 | 1/1960 | Slonneger | 73/378.3 |
| 3,366,136 | 1/1968 | Burton | 267/161 X |
| 3,410,141 | 11/1968 | Zurstadt | 73/368.2 |
| 3,508,020 | 4/1970 | Culver | 267/161 X |
| 3,766,783 | 10/1973 | Tortoso | 73/368.2 |

OTHER PUBLICATIONS

Dacey, J. R., et al. Adsorbtion on Saran Charcoal, in Trans. Faraday Soc., Vol. 50, pp. 740–748 (1954).
Adams, L. B., et al. Adsorbtion by Organic Vapours by Saran–Cabon Fibres and Powders, in Carbon (1970), Vol. 8, pp. 761–772.

*Primary Examiner*—Richard C. Queisser
*Assistant Examiner*—Frederick Shoon
*Attorney, Agent, or Firm*—Anthony A. O'Brien

[57] ABSTRACT

A fluid pressure responsive device, such as a device sensing the thermal expansion or contraction of a fluid, has a movable member biased by a spring against the pressure of the fluid. The spring has a force differential coefficient which is substantially less than the force differential coefficient of a linear spring throughout the range of movement of the movable member.

9 Claims, 4 Drawing Figures

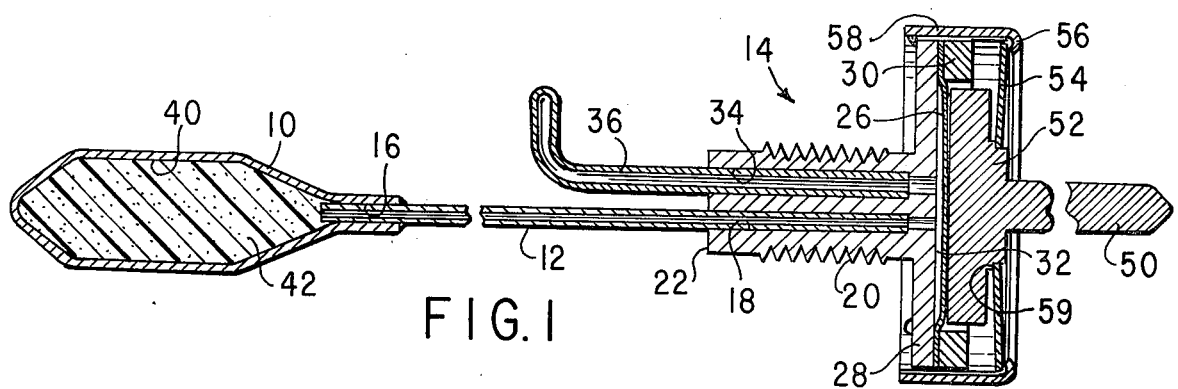
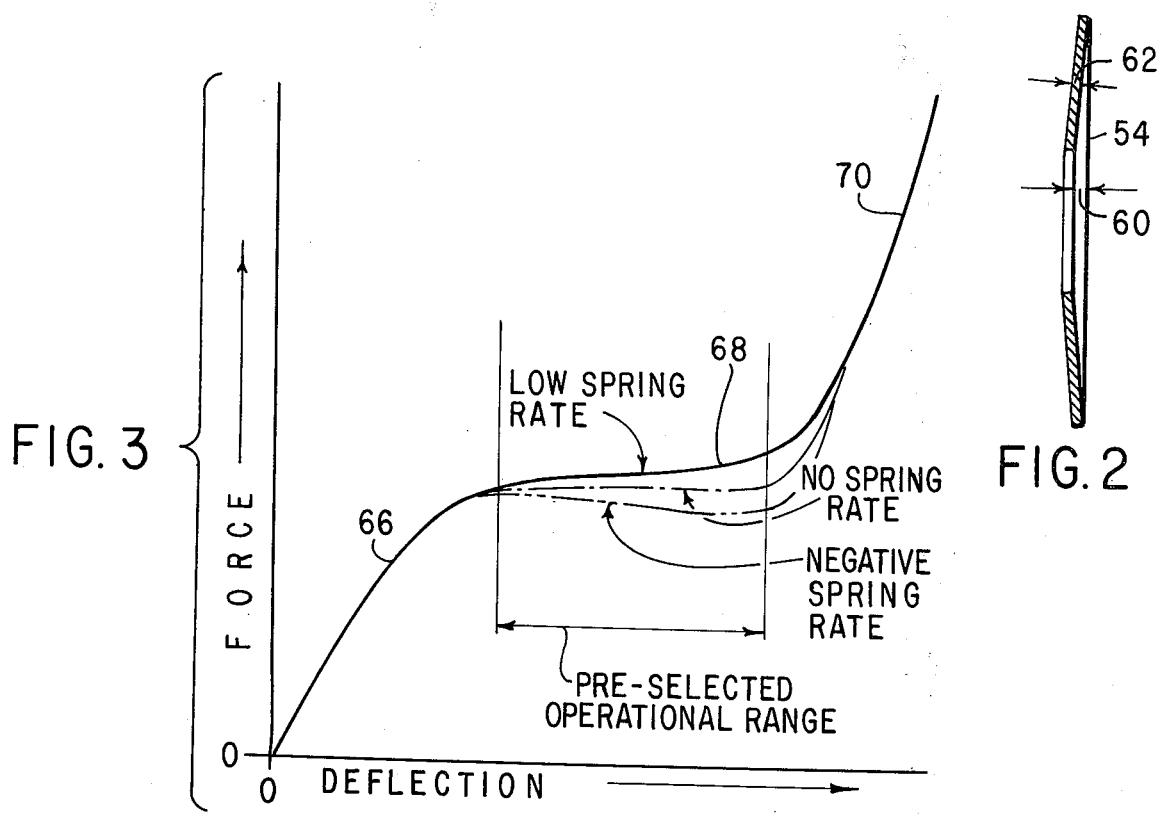
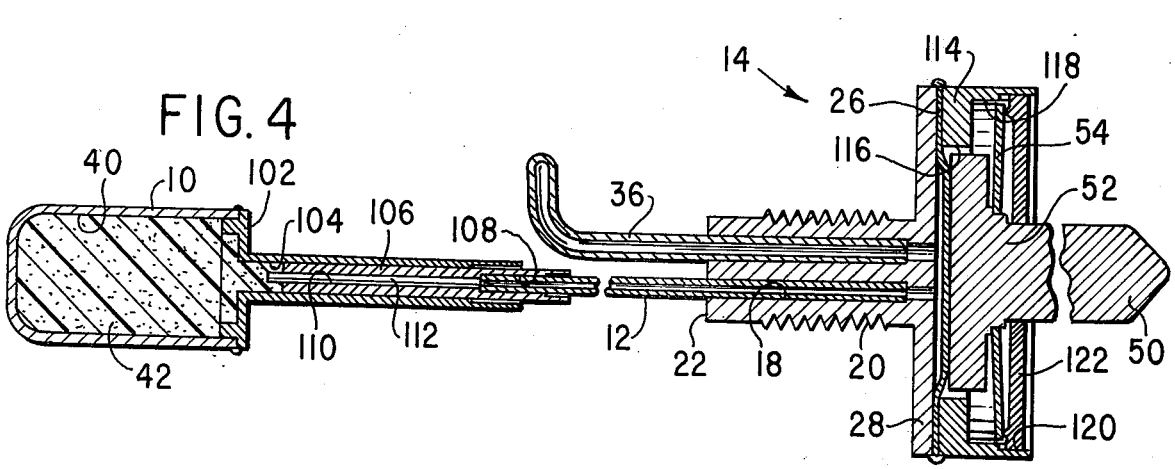

FLUID PRESSURE RESPONSIVE DEVICE

BACKGROUND OF THE INVENTION

1. Field of the Invention

The invention relates to fluid pressure responsive devices and, in particular, to devices employing a member which is movable by a fluid pressure and volume change, such as fluid expansion and contraction in response to changes in temperature.

2. Description of the Prior Art

The prior art, as exemplified by U.S. Pat. Nos. 2,290,093, 2,336,339, 2,340,685, 2,627,911, 2,787,130, 2,847,033, 3,159,346 and 3,180,956, contains many thermal responsive devices which employ the expansion of an element or medium such as a gas to move a member. Some of the prior art thermal responsive devices employ linear springs to bias the movable member against the pressure of a gas; such linear springs providing a linear increase in backward force against volume changes which results in less volume change as the pressure of the gas increases within the system. Other prior art thermal responsive devices employ snap acting disk-like springs which are snapped through a center reversal position; such prior art snap-acting-spring containing devices require a substantial amount of pressure change to bring the springs to their reversal position; and such snap-acting-spring-containing devices, once reversed, require a substantial amount of reverse force to return them back through the reversal position to their initial position.

SUMMARY OF THE INVENTION

The invention is summarized in that a fluid pressure transducer includes a member movable through a range in response to fluid pressure; and spring means for biasing the movable member in opposition to the force of the fluid pressure throughout the range of movement of the movable member; the spring means having a force differential co-efficient which is substantially less than the force differential coefficient of a linear spring throughout the range of movement of the movable member.

An object of the invention is to construct a fluid kinetic energy responsive device which converts a substantial amount of an increase in kinetic energy into movement of a member rather than into pressure increase.

Another object of the invention is to provide a rapid action transducer which responds rapidly at a set temperature or pressure range.

It is also an object of the invention to construct a thermal responsive fluid expansion and contraction device which can be reliably and repeatably manufactured in quantities.

Additional features of the invention include the provision of an improved gas adsorbent and gas charge in combination with a non-linear spring; and the provision of a Belleville spring having a height which is from 0.4 to 2.83 times the thickness of the spring.

Other objects, features and advantages of the invention will be apparent from the specification taken in conjunction with the accompanying drawings.

BRIEF DESCRIPTION OF THE DRAWINGS

FIG. 1 is a cross section view of a thermal responsive device in accordance with the invention.

FIG. 2 is a cross section view of a Belleville spring in the expansion device of FIG. 1.

FIG. 3 is a graph with a curve of the force required to produce deflection of the Belleville spring of FIGS. 1 and 2.

FIG. 4 is a cross section of a modified thermal responsive device according to the invention.

DESCRIPTION OF THE PREFERRED EMBODIMENT

As illustrated in FIG. 1, the invention is embodied in a thermal responsive device including a bulb 10 connected by a capillary or tube 12 to a fluid pressure responsive device or transducer indicated generally at 14. One end of the tube 12 is suitably secured within an opening 16 of the bulb 10, and the other end of the tube 12 is suitably secured within a bore 18 extending through a threaded portion 20 of a support member 22 in the fluid pressure responsive device 14.

A diaphragm 26, such as a 0.127 millimeter (0.005 inch) thick sheet of 301 stainless steel, is secured to the outer edge of a flat face on a flange portion 28 of the support member 22 by a spacer 30 and suitable means, such as a seam weld, to form a chamber 32 into which bore 18 opens. A bore 34 extending through the threaded portion 20 of the support member 22 has a charging tube 36 suitably secured therein for communicating with the chamber 32.

The bulb 10 is made from a metal or other suitable thermal-conductive material and has a chamber 40 which communicates with the tube 12 and contains a gas adsorbent material 42. The chamber 40, the tube 12 and the chamber 32 contain a charge of gas which can be adsorbed in substantial quantities by the adsorbent material 42. Alternately, the adsorbent material 42 can be left out of the chamber 40; and the chamber 40, the tube 12 and the chamber 32 can be filled with a thermally expandable fluid such as a gas or a liquid which generates a substantial vapor pressure at the desired operating temperature.

For the adsorbent material and gas containing thermal responsive device, any gas which is non-reactive at the temperature of use can be employed so long as the gas has a molecular size which is readily adsorbed by the adsorbent material 42. Suitable gases can be selected from the noble gases helium, neon, argon, krypton and xenon. The particular gas used is selected by considering the cost and the desired pressure or volume change per degree temperature change, which pressure or volume change increases directly with the molecular weight of the gas; for example, xenon produces a greater pressure or volume change per degree temperature change than krypton.

The adsorbent material 42 is selected from one of the activated materials, such as activated charcoal, or the like, or can be an adsorbent carbon material made from granules of a compound containing carbon and a non-carbon component by removing the non-carbon component leaving a carbonaceous skeletal structure having cavities of sufficient size to receive and adsorb substantial quantities of the gas. Such decomposable compounds include synthetic polymers, such as polyvinylidene chloride and polyvinylidene fluoride, having volatile components, such as hydrogen and a halogen, which can be driven off by heat leaving a carbonaceous skeletal structure which is porous. Polyvinylidene chloride or polyvinylidene fluoride are formed into adsorbent carbons by carbonizing or pyrolytic decomposition in a purifying atmosphere, such as a vacuum or a purging flow of inert gas. Carbonizing is performed by heating to a temperature less than the melting point but greater than the temperature at which decomposition can be initially observed. For polyvinylidene chloride, carbonizing is performed at a temperature in the range from 138°C (280°F) to 177°C (350°). The duration of heating required for complete carbonization of the synthetic polymer is dependent upon the size of the granules of the synthetic polymer and the temperature employed. Along with utilizing a predetermined temperature and duration for a certain size of granular synthetic polymer, observation of a reduction in gas being removed by a vacuum system or the gas being evolved from the granular material are other methods of determining complete carbonization. During carbonization, the non-carbon components, that is hydrogen and the halogen, are volatilized and removed from the synthetic polymer structure leaving a carbon skeletal structure which is highly porous. After the synthetic polymer is carbonized, the carbonized polymer can be subjected to a higher temperature up to about 1510°C (2750°) to outgas hydrogen and halogen gases which have been adsorbed. Outgassing can be completed in a short duration, for example 15 minutes.

A plunger 50 has a head portion 52 which is biased against the diaphragm 26 by nonlinear spring means, such as a washer-like or nearly-flat frusto-conical spring 54, known as a Belleville spring. The outer periphery of the spring 54 is held by an annular retainer 58 suitably extending or telescoped over and secured to the flange portion 28 of the support member 22 such as by welding. The right side, as viewed in FIG. 1, of the outer periphery of the spring 54 is engaged by a lip 56 of the retainer 58. The left side of the inner periphery surrounding an opening through which the plunger 50 extends engages a shoulder 59 of the plunger 50. The spring 54 is formed from a suitable metal having elastic or spring properties within the range of operation and has an apex which extends to the left, as viewed in FIG. 1. Also, the spring 54 has a height as indicated at 60 in FIG. 2 between the arrows and a thickness as indicated at 62 between the arrows.

As used herein, the term "spring rate" or "force differential coefficient" refers to the incremental amount of additional force required to produce an additional incremental deflection per such incremental deflection of a spring. For a linear spring where the deflection is equal to the applied force times a constant, the force differential coefficient is equal to the constant throughout the range of operation of the spring.

As shown in FIG. 3, the spring 54 has a force per deflection which is non-linear. A first portion 66 of a force deflecting curve has a high spring rate or a force differential coefficient approximately equal to that of a linear spring. A second portion 68 of the force-deflection curve has a low spring rate or a force differential coefficient which is substantially less than that of a linear spring. A third portion 70 of the force-deflection curve has a high spring rate or a force differentail coefficient which exceeds that of a linear spring. The retainer 58 is positioned on the support member 22 such as to bias the operational range of the spring 54 into the portion 68 of the curve wherein the spring 54 has a low spring rate or force differential coefficient which is substantially less than that of a linear spring throughout the range of movement of the plunger 50.

The force differential coefficient of the nearly-flat frusto-conical spring 54 is dependent upon the ratio of the height of the spring to the thickness of the spring. For a ratio of height to thickness of 1:0.4 or less, the spring 54 has an essentially linear spring rate throughout the range of operation. For a ratio of height to thickness of 1:2.83 or greater, the spring 54 becomes a snap action spring and produces a negative force when moved past its center of reversal requiring an external force to return it to its initial position. It is preferred for the spring 54 to have a ratio of height to thickenss in the range from 1:1.3 to 1:1.7. Within the range of height to thickness of 1:0.4 to 1:2.83, the spring 54 applies a force against the plunger 50 biasing the head 52 against the diaphragm 26 and the fluid pressure in the chamber 32 throughout the range of movement of the plunger 50.

The range of 1:0.4 to 1:2.83 includes springs having force-deflection curve portions with no spring rate (i.e., zero force differential coefficient) and negative spring rate (i.e., force differential coefficient less than zero), as shown by phantom curves in FIG. 3. An increase in the volume of the chamber 32, absent any change in temperature in the bulb 10, tube 12 and fluid pressure responsive device 14, produces a decrease in the fluid pressure within the chamber 40, tube 12 and chamber 32; where an incremental decrease in fluid pressure produces an incremental reduction in force from the fluid pressure on the plunger 50 smaller in magnitude than the reduction of force by an incremental increase in the deflection of a spring in a negative rate curve portion, the plunger 50 will be moved, similar to a snap action, by the force of the fluid pressure until the spring rate becomes greater (i.e., less negative, zero or positive) and the spring force becomes equal to the force from the fluid pressure in the chamber 32.

The thermal responsive device can be assembled in an indicator, valve, switch or the like where forces exerted on the plunger 50, and the properties of the diaphragm 26 can produce significant effects on the action of the spring 54; for example, a positive rate spring bias against the plunger 50 in addition to a snap-action spring can produce a resultant spring force with a force differential coefficient less than a linear spring.

In manufacture of the thermal responsive device, a measured quantity of adsorbent carbon material 42 is placed within the bulb 10, and the bulb 10, the tube 12, support member 22, diaphragm 26 and spacer 30 are assembled. Also, the tube 36 is sealed within the bore 34 of the support member 22 with the free end of the tube 36 being open. The head 52 of the plunger 50 is placed against the diaphragm 26 and the spring 54 and retaining member 58 are positioned over the plunger with the lip 56 engaging the outer periphery of the spring 54 and with the inner periphery of the spring 54 engaging the shoulder 59. The retaining member 58 is depressed over the edge of the flange portion 28 of the support member 22 until the spring 54 is biased into the preselected operating range 68 (FIG. 3); then, the retaining element 58 is secured to the flange portion 28, thus selecting the operating range of the spring 54.

The thermal responsive device is connected to a suitable evacuating and charging device where a vacuum is applied to the tube 36 to evacuate the chambers 32 and 40 and tube 12 while the bulb 10 is heated to outgas air which is adsorbed by the carbon material 42. The temperature of the bulb 10 is then lowered to a preselected setting temperature or critical temperature of operation of the thermal responsive device while a charge of gas is supplied through the tube 36 into the chambers 32 and 40 and the tube 12. The charge of gas can be measured by a preselected pressure, a preselected force produced by the plunger, or a predetermined movement of the plunger 50. After charging with the gas, the free end of the tube 36 is sealed completing the manufacture of the thermal responsive device.

In operation of the thermal responsive device shown in FIG. 1, a change in temperature of the bulb 10 increases or decreases the pressure of fluid within the chamber 40, tube 12 and chamber 32. When the pressure in the chamber 32 produces a force on the plunger 50 within the operational range of the thermal responsive device, a slight change of pressure within the chamber 32 produces a significant change in the position of the plunger 50; thus, a substantial majority of an increase or decrease in the kinetic energy of the fluid in the bulb 10 due to a change in temperature is converted into a volume change in the chamber 32 rather than into pressure change within the chambers 32 and 40 and tubes 12 and 36. Having the majority of the kinetic energy change of the fluid converted to a volume change in the chamber 32, results in a more efficient and sensitive fluid pressure or thermal responsive device. Additionally, the operational movement of the plunger 50 is substantially limited to a preselected operational range of temperature or pressure, thus eliminating the need for accommodating the plunger movement outside of the preselected range of temperatures of pressures.

With springs having sufficiently negative spring rates, substantially all of the movements of the plunger 50 occur upon an increase to a selected temperature or pressure, or upon a decrease to a selected temperature or pressure. The difference between the temperature or pressure at which the plunger 50 advances and the temperature or pressure at which the plunger 50 retracts can be selected by selecting the magnitude of the negative spring rate or the ratio of height to thickness of the spring 54. Utilizing the pressure of a fluid with a spring having a negative spring rate, which rate is not sufficiently negative to form a snap-acting spring, produces a rapid-acting device which does not require the large return force necessary in the prior art devices employing snap-acting springs.

For thermal responsive devices utilizing gas charges in the bulb 40, tube 12, chamber 32 and tube 36, the change in pressure or volume per degree temperature change is increased by employing the adsorbent material 42 in the bulb 10. Of the adsorbent materials, the carbonacous material formed by removing a non-carbon component from a carbon compound produces more change in pressure or volume per degree temperature change than activated adsorbent materials, particularly when used in conjunction with one of the noble gases.

A modified thermal responsive device is shown in FIG. 4 wherein some parts are identified with the same reference numerals used in the embodiment shown in FIGS. 1 and 2 to illustrate that such commonly identified parts have substantially the same structure and/or function. Bulb 10 has a bulb end 102 secured thereto with the opening 104 formed therein for receiving an adapter 106. The adapter 106 has a forward portion with a bore 108 for receiving and securing the tube 12, and has a rear portion with a bore 110 for receiving a filler wire 112. The filler wire prevents granular carbon material in the chamber from entering the tube 12 as well as reducing the volume within the nonheated portions of the thermal responsive device.

In the pressure responsive device 14, the diaphragm 26 is secured to the outer periphery of the flange portion of the support member 22 along with an annular stud 114. The annular stud 114 has a first diameter portion 116 surrounding and receiving the head 52 of the plunger, a second diameter portion 118 receiving the spring 54 and a third diameter portion 120 receiving and securing a retaining element 122. The third diameter portion may be threaded with the retaining element 122 threaded to form an adjustable screw for setting the spring 54 into the preselected operational range.

Since many modifications, changes in detail and variations may be made to the present embodiment, it is intended that all matter contained in the foregoing description and accompanying drawings shall be interpreted as illustrative and not in a limiting sense.

What is claimed is:
1. A thermal responsive device comprising
means forming a first chamber;
a charge of thermal expandable fluid in the first chamber;
a support member;
a flexible diaphragm secured to the support member and extending over a portion of the support member to form a second chamber;
means defining a passage communicating from the first chamber through the support member to the second chamber;
a plunger having a head portion engaging the diaphragm;
said plunger having a shoulder thereon;
a nearly-flat frusto-conical spring surrounding the plunger and having a height within the range from 0.4 to 2.83 times a thickness of the spring;
said spring having its inner periphery engaging the shoulder with the apex of the spring extending toward the diaphragm;
an annular retainer having an inner lip engaging the outer periphery of the spring; and
said annular retainer extending over and being initially adjustably secured to the support member so as to set the spring in a range where the spring has a force differential coefficient which is substantially less than the force differential coefficient of a linear spring.

2. A thermal responsive device as claimed in claim 1 wherein the nearly-flat frusto-conical spring has a height which is within the range of from 1.3 to 1.7 times the thickness.

3. A thermal responsive responsive device as claimed in claim 1 wherein the thermal expandable fluid is a gas, and the first chamber contains a porous gas adsorbent material.

4. A thermal responsive device as claimed in claim 3 wherein
the adsorbent material is a carbonaceous porous material formed by removing a non-carbon component from a carbon compound.

5. A thermal responsive device as claimed in claim 4 wherein the carbonaceous material is a decomposed synthetic polymer.

6. A thermal responsive device as claimed in claim 5 wherein the decomposed synthetic polymer is selected from decomposed polyvinylidene chloride and decomposed polyvinylidene fluoride.

7. A thermal responsive device comprising
a metal bulb forming a first chamber;
a support member having a flange portion with a substantially flat face;
a flexible diaphragm secured to the periphery of the face and extending over the face to form a second chamber;
a tube communicating between the first and second chamber through the face;
a thermally expandable fluid in the first chamber, the tube and the second chamber;
a plunger having a head portion engaging the diaphragm and having a shoulder;
a nearly-flat frusto-conical spring surrounding the plunger and having a height which is within the range from 0.4 to 2.83 times a thickness of the spring;
said spring having its inner periphery engaging the shoulder with the apex of the spring extending toward the diaphragm;
an annular retainer secured to the flange portion of the support member and engaging the outer periphery of the spring such that the spring is set depressed with the head portion of the plunger biasing the diaphragm toward the face; and
said spring being set initially adjustably depressed by said annular retainer into a range where the spring has a force differential coefficient substantially less than the force differential coefficient of a linear spring.

8. A thermal responsive device as claimed in claim 7 wherein
the fluid is a gas, and
the bulb contains a gas adsorbent material.

9. A thermal responsive device comprising
a metal bulb forming a first chamber;
a quantity of carbonized polyvinylidene chloride in the first chamber;
a support member having a flange portion with a substantially flat face;
a flexible diaphragm secured to a periphery of the face to form a second chamber;
a tube connecting the first chamber to the second chamber through the face;
a charge of gas selected from helium, neon, argon, krypton and xenon in the first chamber, tube and second chamber;
a plunger having a head portion with a shoulder;
an annular retainer with an inward extending lip;
a nearly-flat frusto-conical spring having an outer periphery engaged on a first side by the lip of the retainer and having an inner periphery engaged on a second side by the shoulder of the plunger;
said spring having a height which is within the range from 0.4 to 2.83 times the thickness of the spring; and
said retainer initially adjustably telescoped over the flange portion and secured to the flange portion such as to set the nearly-flat frusto-conical spring into a range of operation where the spring has a force differential coefficient of a linear spring.

* * * * *